US006628859B2

(12) United States Patent
Huang et al.

(10) Patent No.: US 6,628,859 B2
(45) Date of Patent: Sep. 30, 2003

(54) BROADBAND MODE CONVERTER

(75) Inventors: Lin Huang, Belle Mead, NJ (US); Justin Boyd Judkins, Santa Barbara, CA (US)

(73) Assignee: Triquint Technology Holding Co., Hillsboro, OR (US)

( * ) Notice: Subject to any disclaimer, the term of this patent is extended or adjusted under 35 U.S.C. 154(b) by 255 days.

(21) Appl. No.: 09/815,142

(22) Filed: Mar. 22, 2001

(65) Prior Publication Data

US 2003/0048986 A1 Mar. 13, 2003

(51) Int. Cl.⁷ .................................. G02B 6/26
(52) U.S. Cl. ............................ 385/28; 372/50
(58) Field of Search ................ 385/28–38, 147, 385/129–133; 372/50; 333/21 R, 113

(56) References Cited

U.S. PATENT DOCUMENTS

| 4,153,328 A | * | 5/1979 | Wang | 385/28 |
| 4,282,458 A | * | 8/1981 | Barnett | 315/4 |
| 4,701,011 A |   | 10/1987 | Emkey et al. | |
| 4,750,802 A |   | 6/1988 | Bhagavatula | |

(List continued on next page.)

FOREIGN PATENT DOCUMENTS

| EP | 0 074 789 A2 | 3/1983 |
| EP | 0 997 751 A2 | 5/2000 |
| WO | WO 99/49340 A2 | 9/1999 |
| WO | WO 99/49341 A1 | 9/1999 |
| WO | WO 99/49342 A1 | 9/1999 |

OTHER PUBLICATIONS

B.E.A. Saleh et al., "Electromagnetic Optics," Fundamentals of Photonics, 1991, pp. 174–191, John Wiley & Sons, Inc. ISBN 0–471–83965–5.
B.E.A. Saleh et al., "Fiber Optics," Fundamentals of Photonics, 1991, pp. 272–306, John Wiley & Sons, Inc. ISBN 0–471–83965–5.
Hecht, Jeff, "Dispersion control boosts high–speed transmission," Laser Focus World, Jul. 2000, (4 pages).
Internet Pages: LaserComm, Inc. http://www.lasercomm-inc.com/tech.htm, Aug. 2000 (5 pages).

Primary Examiner—Akm Enayet Ullah
(74) Attorney, Agent, or Firm—Christie, Parker & Hale, LLP

(57) ABSTRACT

A mode converter for converting an optical signal from a first propagation mode (e.g., $LP_{01}$) to a second propagation mode (e.g., $LP_{02}$). The mode converter includes a first waveguide supporting a first mode of propagation. The mode converter also includes a second waveguide supporting a second mode of propagation. The first and second waveguides each having a group index characteristic, wherein the first group index characteristic is matched with the second group index characteristic such that electromagnetic energy propagating through the first waveguide at the first mode couples to the second waveguide at the second mode.

20 Claims, 6 Drawing Sheets

U.S. PATENT DOCUMENTS

| | | | |
|---|---|---|---|
| 4,768,853 A | 9/1988 | Bhagavatula | |
| 4,828,350 A | 5/1989 | Kim et al. | |
| 4,894,627 A * | 1/1990 | Kane | 333/113 |
| 4,953,947 A | 9/1990 | Bhagavatula | |
| 4,956,620 A * | 9/1990 | Moeller | 333/21 R |
| 4,974,931 A | 12/1990 | Poole | |
| 4,986,624 A | 1/1991 | Sorin et al. | |
| 5,030,929 A * | 7/1991 | Moeller | 333/21 R |
| 5,043,629 A * | 8/1991 | Doane | 315/5 |
| 5,185,827 A | 2/1993 | Poole | |
| 5,200,795 A | 4/1993 | Kim et al. | |
| 5,261,016 A | 11/1993 | Poole | |
| 5,311,346 A | 5/1994 | Haas et al. | |
| 5,371,815 A | 12/1994 | Poole | |
| 5,448,674 A | 9/1995 | Vengsarkar et al. | |
| 5,533,155 A | 7/1996 | Barberio et al. | |
| 5,587,827 A | 12/1996 | Hakimi et al. | |
| 5,611,016 A | 3/1997 | Fangmann et al. | |
| 5,717,798 A | 2/1998 | Strasser et al. | |
| 5,781,673 A | 7/1998 | Reed et al. | |
| 5,802,234 A | 9/1998 | Vengsarkar et al. | |
| 5,878,182 A | 3/1999 | Peckham | |
| 5,999,679 A | 12/1999 | Antos et al. | |
| 6,118,523 A | 9/2000 | Brener et al. | |
| 6,169,757 B1 * | 1/2001 | Merritt | 372/50 |
| 6,404,793 B1 * | 6/2002 | Merritt | 372/50 |

* cited by examiner

BROADBAND MODE CONVERTER

FIELD OF THE INVENTION

The present invention relates to mode converters.

BACKGROUND OF THE INVENTION

An optical mode converter is a coupling device for converting an optical signal from a first propagation mode (e.g., $LP_{01}$) to a second propagation mode (e.g., $LP_{02}$). Mode converters typically comprise a single-mode step-index optical fiber for supporting the propagation of an optical signal at the fundamental mode (i.e., $LP_{01}$) and a multi-mode step-index optical fiber for supporting the propagation of an optical signal at one or more other modes (e.g., $LP_{02}$). A portion of the cladding is removed from each of the optical fibers. As such, the optical fibers may be spaced at a distance, thereby allowing an evanescent field from an optical signal propagating through one of the optical fibers to couple into the second optical fiber of the mode converter. Once coupled into the second optical fiber, the optical signal propagates at the mode supported by the second optical fiber.

Mode converters have been employed in various applications requiring an interface between two waveguides supporting different propagation modes. One such application for mode converters is in dispersion compensation systems. Dispersion compensation systems remove overlaps created by the broadening of optical signals propagating through a carrier optical waveguide. One known dispersion compensation system includes a specially designed multi-mode optical waveguide supporting a number of propagation modes (e.g., $LP_{02}$)—each supported mode being higher than the fundamental mode (i.e., $LP_{01}$). In contrast, a typical carrier optical waveguide is a single-mode fiber supporting the fundamental propagation mode. Consequently, a mode converter is needed to couple the carrier optical waveguide to the specially designed multi-mode optical waveguide in such a way that an optical signal propagating through the carrier optical waveguide at the fundamental mode may be converted to one of the propagation modes supported by the specially designed multi-mode optical waveguide.

Presently, commercially available mode converters are only operable over a narrow range—10 nm or less—of wavelengths. This narrow range of present day mode converters has now become a problem. In particular, to accommodate the explosive growth of voice and data traffic, industry has continued to increase the number of available channels in a wavelength division multiplexed ("WDM") system. To support this increase in WDM channels, a growing need has arisen to compensate for dispersion over a wider range of wavelengths, and thus to have mode converters operable over a wider range of wavelengths than has been achieved to this point.

SUMMARY OF THE INVENTION

In accordance with the present invention, our mode converter includes a first and a second waveguide, each supporting different modes of propagation, while having matching group index characteristics. We have recognized that by matching the group index characteristics of the first and second optical waveguides, the operable range of wavelengths for a mode converter may be expanded.

In another embodiment of the present invention, we match the slope of an $LP_{01}$ mode propagation constant of a single-mode optical fiber with the slope of an $LP_{02}$ mode propagation constant of a multi-mode optical fiber to match the group index characteristics of both fibers.

In yet another embodiment of the present invention, the matched group index characteristics are approximately within (+/−) five (5) percent of each other. We estimate that by matching the group index characteristics of the single mode and multi-mode fibers as such, our mode converter may operate over a range of at least 40 nm, in contrast with the 10 nm operable range of present day mode converters. It will be apparent to skilled artisans upon reviewing the instant disclosure that the more precisely the group index characteristics are matched, the greater the coupling efficiency of the mode converter.

BRIEF DESCRIPTION OF THE DRAWINGS

The present invention will be better understood from reading the following description of non-limiting embodiments, with reference to the attached drawings, wherein below.

DETAILED DESCRIPTION OF THE PRESENT INVENTION

Figure 1A:
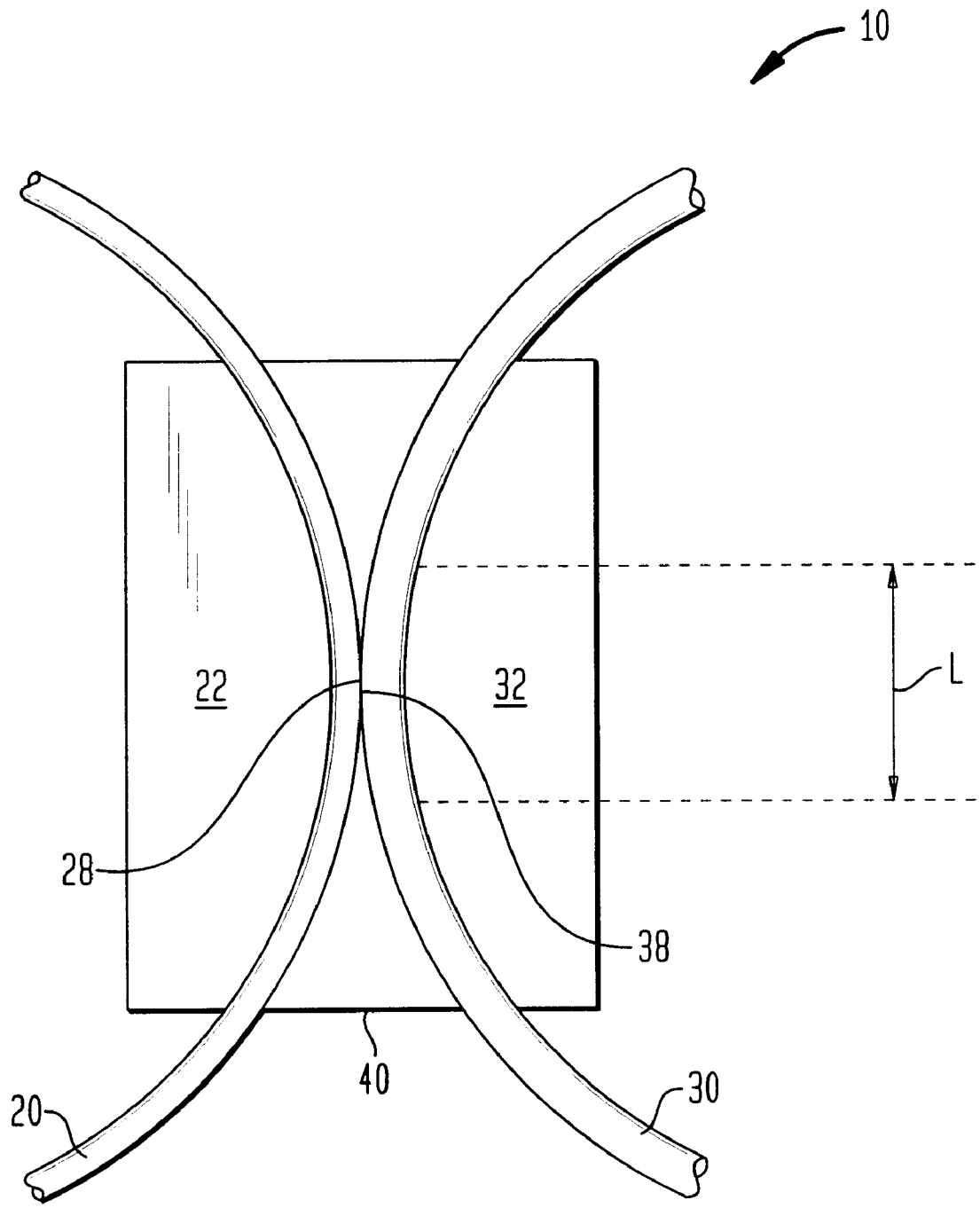
FIGS. 1(a) is a top view.
Figure 1B:
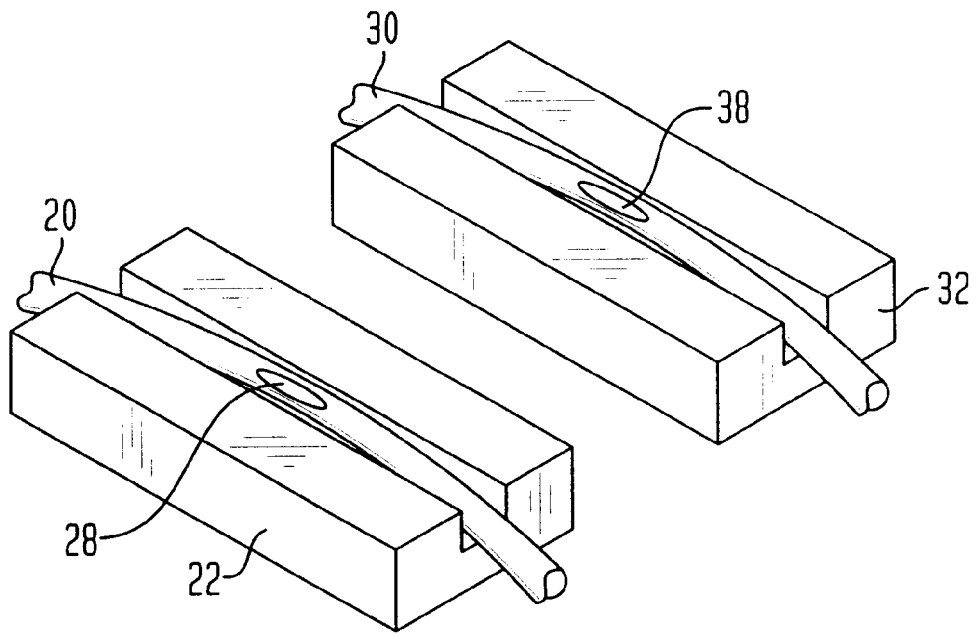
FIG. 1(b) is an exploded perspective view.
Figure 1C:
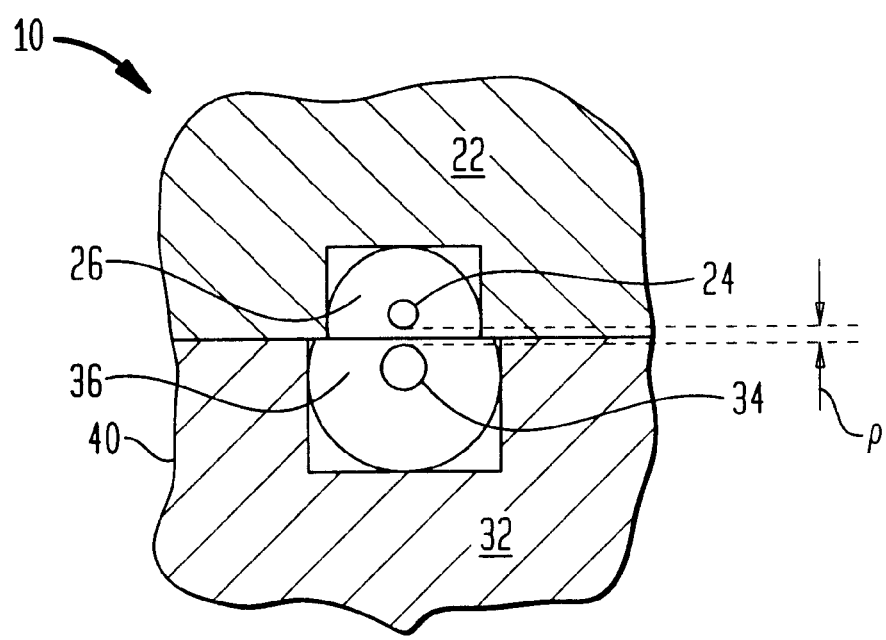
FIG. 1(c) is a cross-sectional view of an embodiment of the present invention.

Referring to FIGS. 1(a), 1(b) and 1(c), an embodiment of the present invention is illustrated. Here, a broadband mode converter 10 is shown. Broadband mode converter 10 converts an optical signal from a first propagation mode to a second propagation mode. In one example, broadband mode converter 10 receives an optical signal propagating at the fundamental mode (i.e., $LP_{01}$) and converts the received optical signal to a second mode (i.e., $LP_{02}$) of propagation. It will be apparent to skilled artisans from the instant disclosure, however, that broadband mode converter 10 may be more generally employed to convert a received optical signal from one mode of propagation to another mode of propagation.

Broadband mode converter 10 comprises a single mode fiber 20 and a multi-mode fiber 30 formed on a substrate 40. Single mode fiber 20 comprises a core 24 and a cladding 26, each having an effective refractive index profile. The effective refractive index profiles of core 24 and cladding 26, as well as the diameter of core 24 are selected to enable an optical signal to propagate at the fundamental mode (i.e., $LP_{01}$) through single mode fiber 20. Similarly, multi-mode fiber 30 comprises a core 34 and a cladding 36, each having an effective refractive index profile. The effective refractive index profiles of core 34 and cladding 36, as well as the diameter of core 34 are selected to enable an optical signal to propagate at least at a second mode (i.e., $LP_{02}$) through multi-mode fiber 30.

Broadband mode converter 10 is formed by mounting single mode fiber 20 in a radial groove of a first component substrate 22 and mounting multi-mode fiber 30 in a radial groove of a second component substrate 32. First and second component substrates 22 and 32 may each be formed from high quality quartz. Using various known adhesive resins and/or hard epoxies, such as UV adhesive MH 77, first and second component substrates, 22 and 32, are adjoined to form integrated substrate 40, and broadband mode converter 10. Prior to forming integrated substrate 40, the upper surfaces of first and second component substrates 22 and 32 are polished using cerium oxide such that a portion 28 of cladding 26 is removed from single mode fiber 20, and a portion 38 of cladding 36 is removed from multi-mode fiber 30. Consequently, portions 28 and 38 of single mode and multi-mode fibers, 20 and 30, are aligned and spaced at a distance to allow an evanescent field from an optical signal propagating through one fiber, such as single mode fiber 20, for example, to couple into the other fiber, such as multi-mode fiber 30, for example. Advantageously, broadband mode converter 10 may be designed to excite only the $LP_{01}$ mode in multi-mode fiber 30. In this regard, design considerations include the effective index profile of fibers 10 and 20, as well as the physical layout of broadband mode converter 10.

Broadband mode converter 10 is operable over a wider range of wavelengths than presently available mode converters. To date, mode converters are operable over 10 nm or less—commonly referred to as the device bandwidth. We have recognized that the device bandwidth of presently known mode converters may be expanded by matching the group index characteristic of single mode fiber 20 with the group index characteristic of multi-mode fiber 30. We achieve this bandwidth increase, in effect, by increasing the coupling efficiency of broadband mode converter 10. We have identified that the coupling efficiency of broadband mode converter 10 corresponds with the degree of matching between the group index characteristics of single and multi-mode fibers 20 and 30. It should be noted that the coupling efficiency of broadband mode converter 10 also depends on the coupling length, L, and the distance, ρ, between core 24 and core 34, among additional considerations.

Fundamentally, the group index characteristic, N, of an optical waveguide may be characterized by the following mathematical expression:

$$N = n - \lambda * dn/d\lambda$$

where n is the effective refractive index of the waveguide, and λ is the center wavelength of a transverse wave propagating through the core of the waveguide. In accordance with the present invention, we have formulated an effective refractive index profile for each fiber using finite element analysis to enable the group index characteristic, N, of single mode fiber 20 to match with the group index characteristic, N, of multi-mode fiber 30. We have recognized that by matching of the group index characteristics, the bandwidth of broadband mode converter 10 may be expanded and its coupling efficiency enhanced, as detailed hereinbelow.

In an additional embodiment of the present invention, we match the slope, $\beta_3$, of the $LP_{01}$ mode propagation characteristic of single mode fiber 20 with the slope, $\beta_3$, of the $LP_{02}$ mode propagation characteristic of multi-mode fiber 30 by developing an effective refractive index profile for each fiber using finite element analysis. Mathematically, the slope, $\beta_3$, of the mode propagation characteristic of a waveguide directly corresponds with its group index characteristic, N. As is well known to skilled artisans, the slope, $\beta_3$, may be expressed as a third order term of the effective refractive index, with respect to the group index characteristic, N. For more information on effective refractive index, n, and the slope, $\beta_3$, of a mode propagation characteristic, as they pertain to the group index characteristic, N, of an optical waveguide, see Hall and Thompson, "Selected Papers on Coupler-Mode Theory in Guided-Wave Optics," SPIE Milestone Series 1993, Saleh and Teich, "The Fundamentals of Photonics," Wiley and Sons 1991, Miller and Chynoweth, "Optical Fiber Telecommunications" Academic Press 1979, and Tamir, "Integrated Optics," ($2^{nd}$ Edition) Springer-Verlag 1979.

Figure 2:
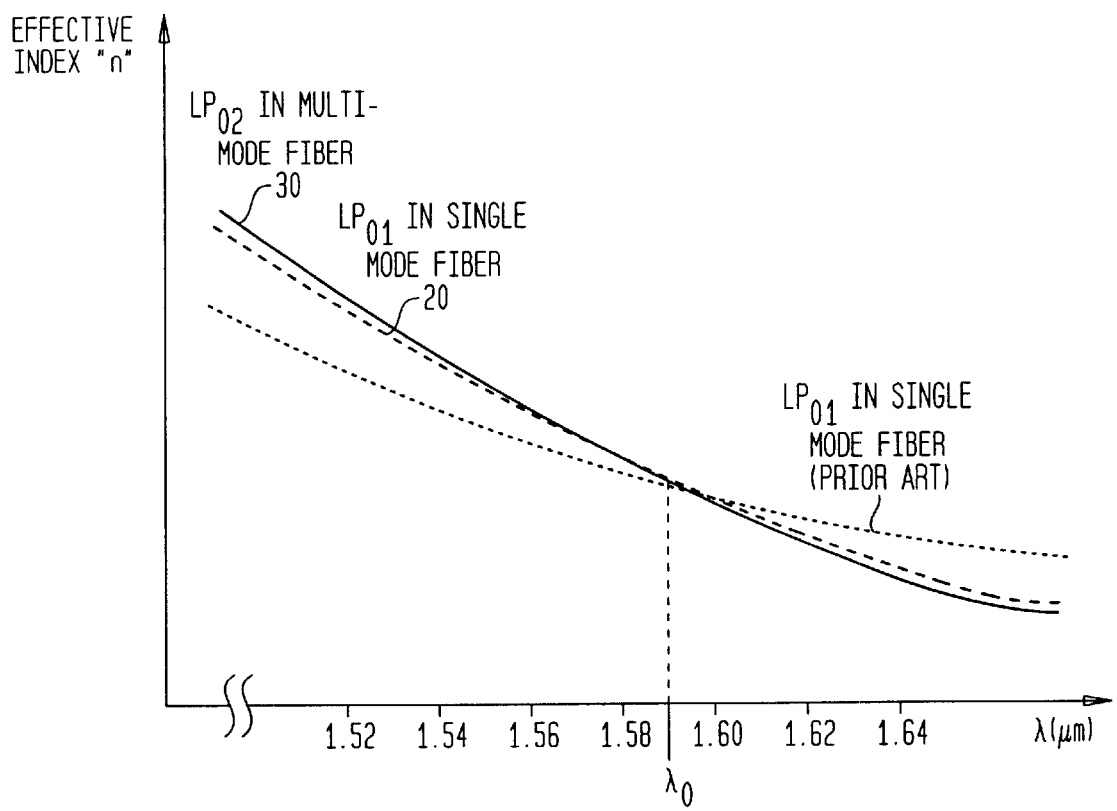
FIG. 2 is an illustration of an embodiment of the present invention.

Referring to FIG. 2, broadband mode converter 10 is graphically illustrated according to another embodiment of the present invention. FIG. 2 depicts a number of curves, each of which illustrate the wavelength dependence of the effective refractive index of optical fiber. More specifically, FIG. 2 illustrates the effective refractive index characteristics of single mode fiber 20 in support of the propagation of the fundamental mode (i.e., $LP_{01}$) and the effective refractive index characteristics of multi-mode fiber 30 in support of the propagation of a second mode (i.e., $LP_{02}$), both as a function of wavelength. The effective refractive index characteristics of each of the fibers are herein referred to as mode propagation characteristic curves. The mode propagation characteristic curve (i.e., $LP_{01}$) of a typical single mode fiber used in conjunction with a multi-mode fiber, such as fiber 30, is also shown, to provide contrast with broadband mode converter 10, and the present invention.

In presently available mode converters, the fundamental mode (i.e., $LP_{01}$) propagation characteristic curve of the single mode fiber intersects the mode (e.g., $LP_{02}$) propagation characteristic curve of multi-mode fiber 30. At the corresponding wavelength ($\lambda_0$) of this intersection point, the effective indexes of both fibers of this known mode converter are equivalent. As such, an optical signal having a wavelength $\lambda_0$ and propagating at a first mode (e.g., $LP_{01}$) may be optimally converted with maximum coupling efficiency to a second mode (e.g., $LP_{02}$) using this known mode converter design. However, as noted hereinabove, this approach has a very narrow bandwidth.

As graphically illustrated, the mode propagation characteristic curve of each fiber decreases as the wavelength is increased. Each mode propagation characteristic curve has a slope—the rate in which the effective refractive index changes as a function of the rate of change of the wavelength, Δn/Δλ or dn/dλ. In accordance with the present invention, we have fabricated a single mode fiber (i.e., fiber 20) having a fundamental mode propagation characteristic curve whose slope is matched with the slope of a higher mode (e.g., $LP_{02}$) propagation characteristic curve of a multi-mode fiber (i.e., fiber 30). We have recognized that the bandwidth of a mode converter may be extended beyond that of known mode converters by matching these slopes. Broadband mode converter 10 operates at wavelengths where the difference in effective refractive indexes is relatively small. By theoretical and computational deduction, we have recognized that matching the slopes of both mode propagation characteristic curves extends the bandwidth of broadband mode converter 10. The slopes of the mode propagation characteristic curves of fibers 20 and 30 are matched by employing specifically designed effective refractive index profiles, as will be detailed hereinbelow in conjunction with FIGS. 4(*a*) and 4(*b*).

In addition to matching the slopes of both curves, the mode propagation characteristic curves of fibers 20 and 30 intersect in at least one point to provide a sufficient degree of coupling efficiency. In so doing, an optical signal propagating at a first mode (e.g., $LP_{01}$) may effectively be converted by broadband mode converter 10 to a second mode (e.g., $LP_{02}$). Advantageously, this one intersection point is positioned at the center of the region where the slopes both curves match. Fundamentally, by matching the slopes of both curves, and causing both curves to intersect, both terms (i.e., n and $\lambda^*dn/d\lambda$) of the group index characteristic, N, of fiber 20 are matched with both terms (i.e., n and $\lambda^*dn/d\lambda$) of the group index characteristic, N of fiber 30.

Figure 3:
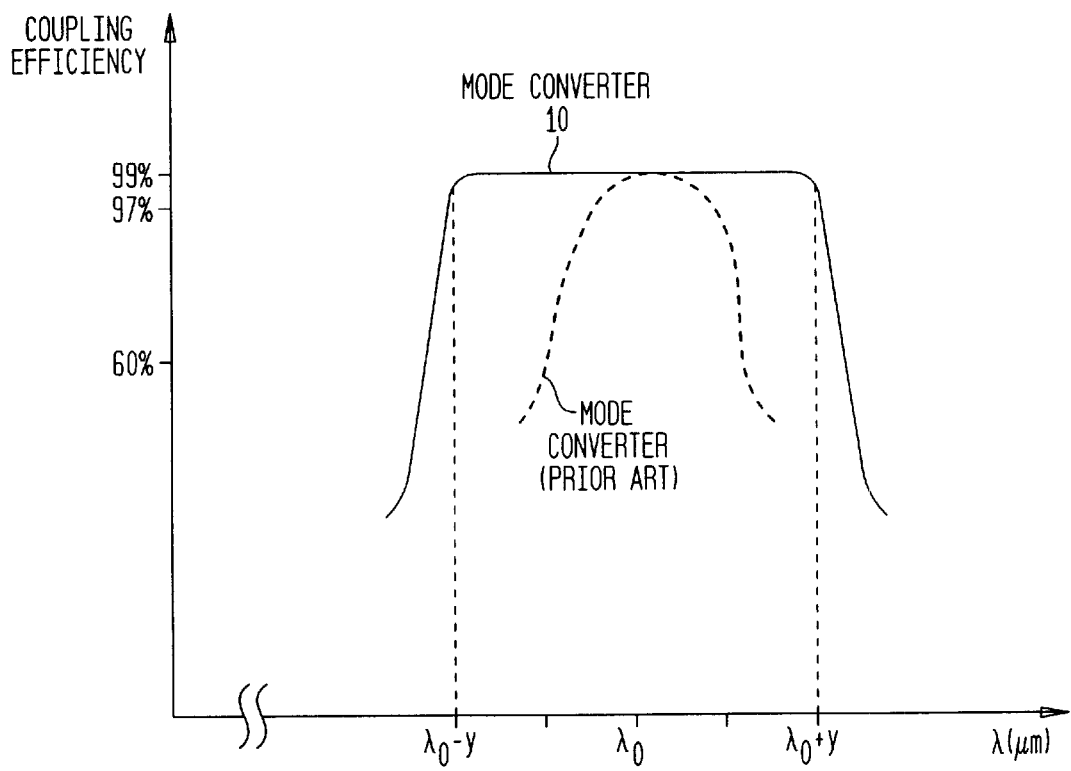
FIG. 3 is an illustration of an aspect of the present invention.

Referring to FIG. 3, an aspect of broadband mode converter 10 is graphically illustrated in contrast with the known art. More particularly, FIG. 3 illustrates coupling efficiency as a function of wavelength. As shown, at wavelength, $\lambda_0$, the coupling efficiency of a mode converter for converting an optical signal from a first mode to a second mode is in the approximate range of 98 and 99 percent. In known mode converters, wavelength, $\lambda_0$, corresponds to the point in which effective refractive index of both single mode and multi-mode fibers are equal—i.e., where the propagation characteristic curves intersect one another. With respect to broadband mode converter 10 of the present invention, wavelength, $\lambda_0$, is advantageously positioned at the center of both curves where the slopes match one another. However, it will be apparent to skilled artisans that wavelength, $\lambda_0$, need not be positioned the center of both curves where the slopes match one another. From FIG. 3, the coupling efficiency of broadband mode converter 10 begins to drop approximately 0.1 dB (97%) at approximately +/−20 nm from the center wavelength—i.e., $\lambda_0$+y and $\lambda_0$−y.

Figure 4A:
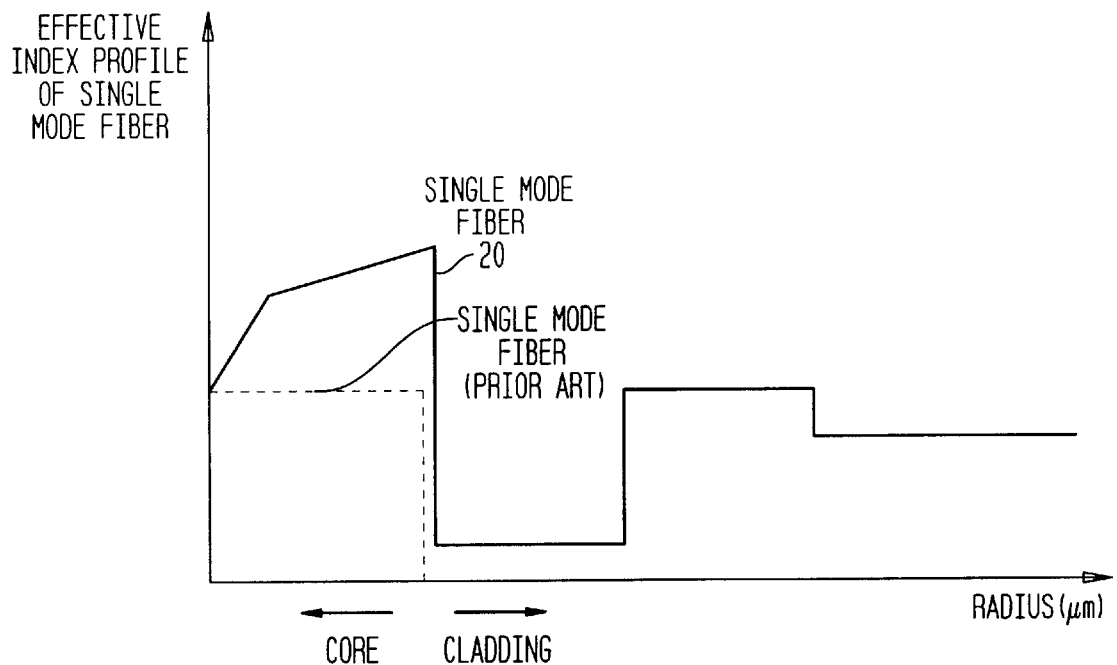
FIGS. 4(a) and 4(b) are illustrations of an aspect of the present invention.
Figure 4B:
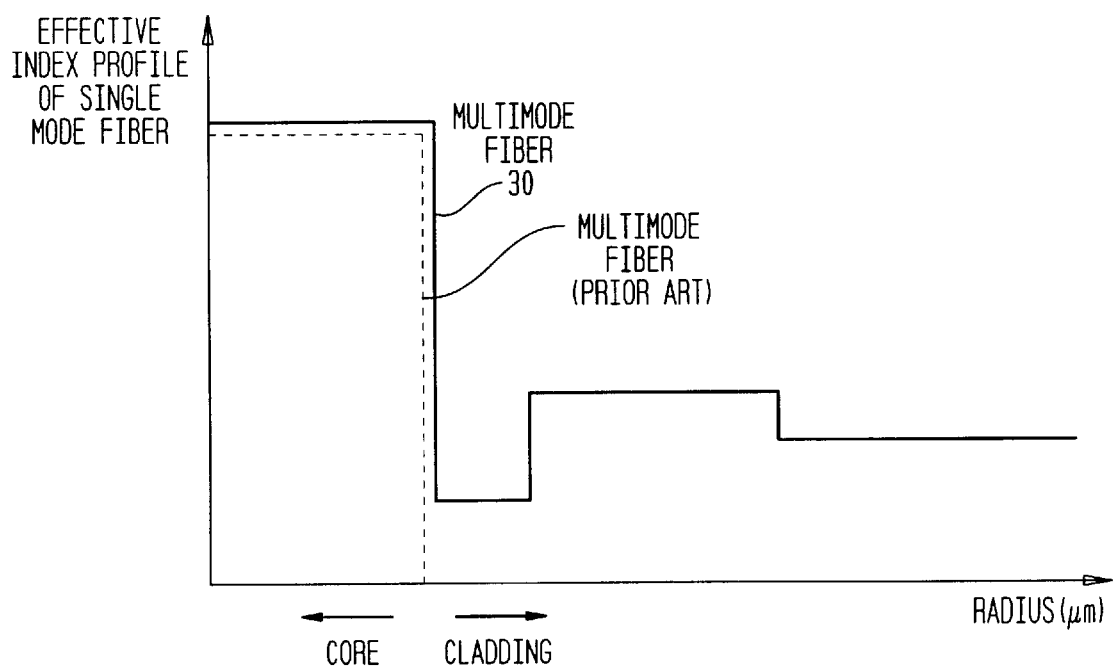

Referring to FIGS. 4(a) and 4(b), another aspect of broadband mode converter 10 is graphically illustrated in contrast with the known art. More particularly, the effective refractive index profiles of single mode and multi-mode fibers employed in broadband mode converter 10 are contrasted with those in presently available mode converters. As shown in FIG. 4(a), the effective refractive index of the typical single mode fiber employed in presently available mode converters is a step function from the center of the core to the cladding. Likewise, the effective refractive index profile of the typical multi-mode fiber employed in presently available mode converters is also a step function from the center of the core to the cladding, as shown in FIG. 4(b). Software packages may be designed and developed, using iterative process steps, to implement effective refractive index profiles which match both terms (i.e., n and $\lambda^*dn/d\lambda$) of the group index characteristics, N, of fibers 20 and 30.

In contrast with the known art, broadband mode converter 10 employs a pair of effective refractive index profiles for both single mode fiber 20 and multi-mode fiber 30 designed to achieve the purposes of the present invention. In the illustrated example, each effective refractive index profile comprises a trench at the beginning of the cladding, and the end of the core. Specially designed coupling fibers with trenches allow for the adjustment and optimization of the fiber's effective refractive index and its mode propagation constant slope. As a consequence of these effective refractive index profiles, the fundamental mode propagation characteristic curve of the typical single mode fiber intersects with the propagation characteristic curve of the typical multi-mode fiber in at least one point.

The pair of effective refractive index profiles is intended to facilitate the matching of the slope of the fundamental mode propagation characteristic curve of single mode fiber 20 with the slope of the second mode (e.g., $LP_{02}$) propagation characteristic curve of multi-mode fiber 30. Techniques known to skilled artisans, including finite element analysis are employed to derive these profiles for one of the objectives of the present invention—i.e., matching the slopes. Once the profiles are designed to the match the slopes of the mode propagation characteristic curves, a preform is fabricated to enable each fiber to be repeatably manufactured.

Figure 5:
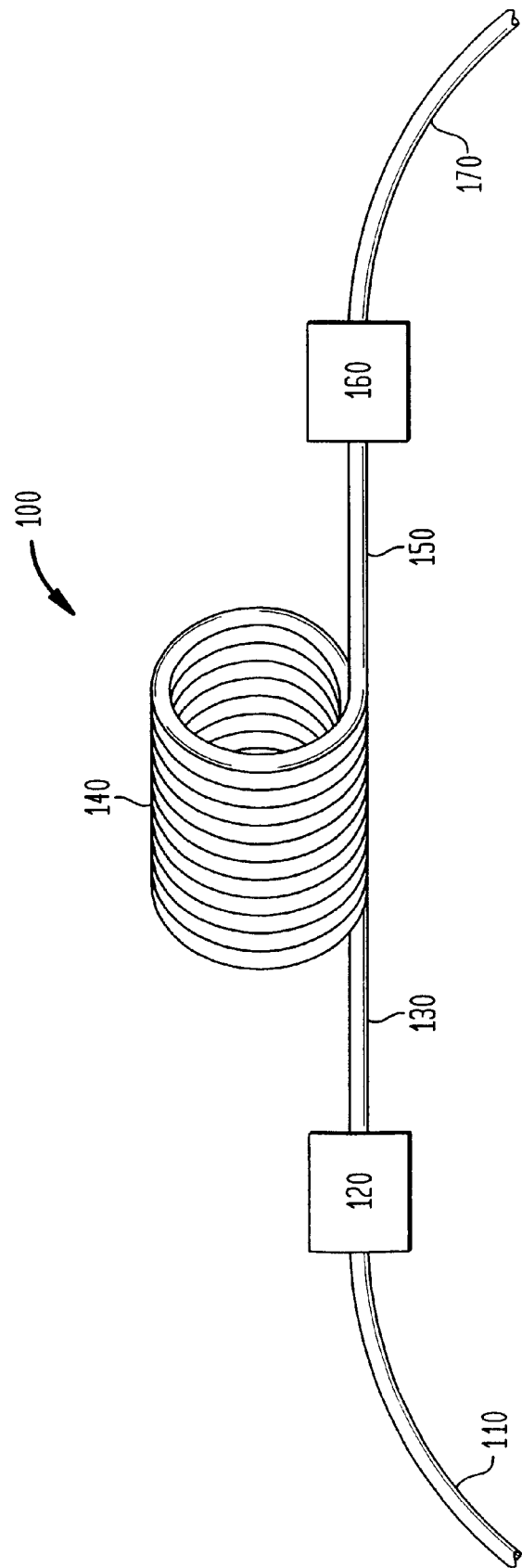
FIG. 5 is an illustration of another embodiment of the present invention.

Referring to FIG. 5, another embodiment of the present invention is illustrated. Here, a system 100 is shown for compensating for dispersion arising in an optical communication system. The optical communication includes a single mode fiber 110 having a number of optical signals propagating therethrough. These optical signals begin to broaden or spread out as they propagate through single mode fiber 110. This broadening phenomenon, commonly referred to as dispersion, is attributable to the fact that each wavelength component of an optical signal travels through a single mode fiber at a distinct speed. Consequently, each wavelength component of an optical signal spreads out as it propagates through a single mode fiber because the different wavelengths components arrive at a particular point at different times.

As a result of this dispersion phenomenon, single mode fiber 110 is coupled with system 100. System comprises a dispersion compensation device 140. Dispersion compensation device 140 may be realized by various elements known to skilled artisans, including a specially designed multi-mode fiber having a first and a second multi-mode interface fiber, 130 and 150. To couple single mode fiber 110 with dispersion compensation device 140 generally, and more particularly with multi-mode interface fiber 130, system 100 further comprises a first mode converter 120. Mode converter 120 converts an optical signal propagating through single mode fiber 110 in the fundamental mode to a mode supported by multi-mode interface fiber 130 to enable enabling dispersion compensation device 140 to effectively compensate for dispersion.

With the dispersion compensated for by dispersion compensation device 140, the optical signal is then prepared to be relaunched back into the optical communication system, generally, and more particularly into another single mode fiber 170. To effectively relaunch the dispersion compensated optical signal, a second mode converter 160 is needed to couple second multi-mode interface fiber 150 with single mode fiber 170. Second mode converter 160 converts the dispersion compensated optical signal propagating at a mode supported by multi-mode interface fiber 130 back into the fundamental mode supported by single mode fiber 170.

Figure 6:
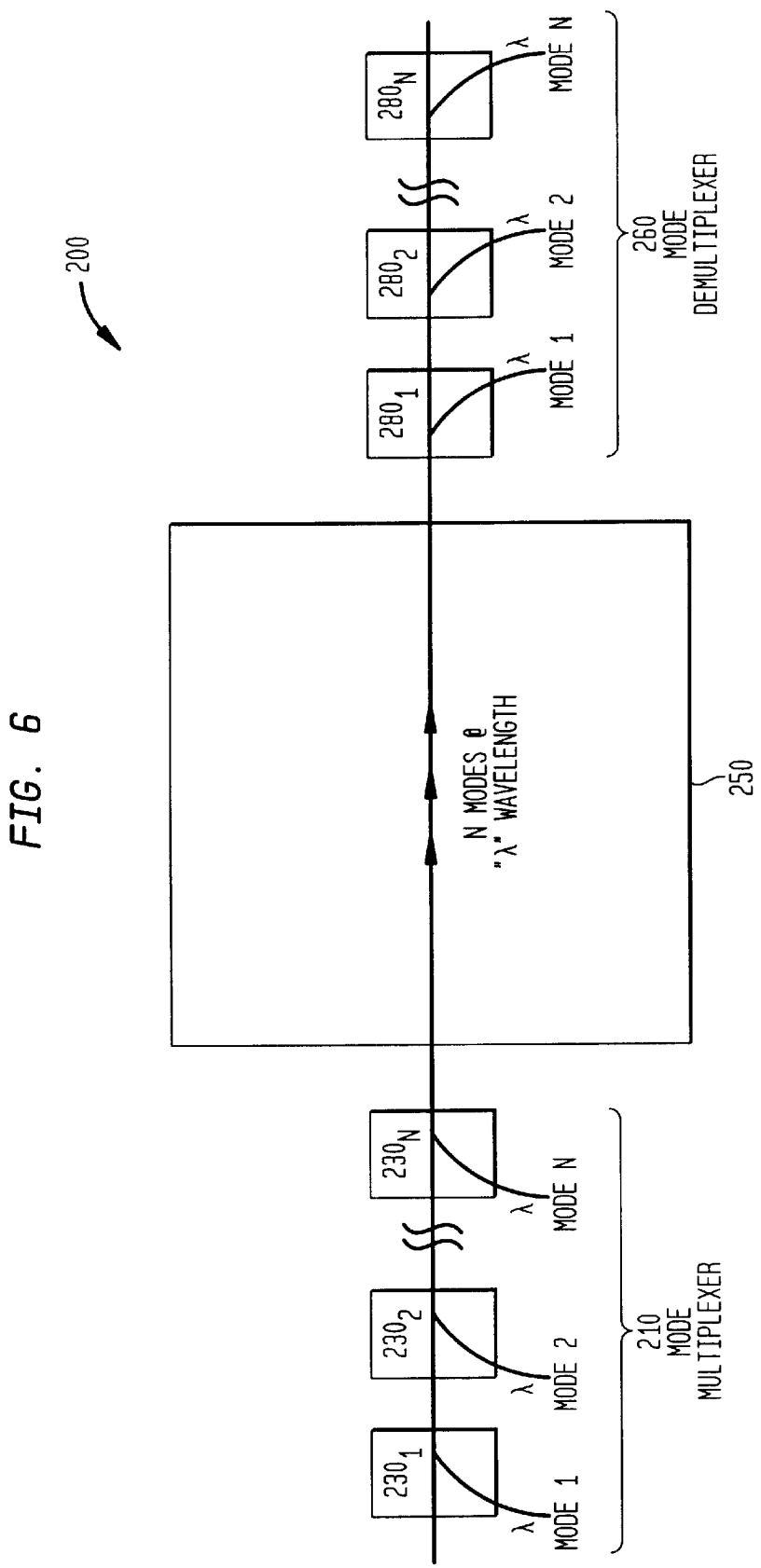
FIG. 6 is an illustration of another embodiment of the present invention.

Referring to FIG. 6, is an illustration of another embodiment of the present invention. Here, an exemplary mode multiplexing device 200 is shown. Mode multiplexing device 200 comprises a mode multiplexer 210, a router 250, and a mode demultiplexer 260. Mode multiplexer 210 comprises N number of mode converters—$230_1$, $230_2$ . . . $230_N$. Each mode converter feeds an optical signal having a wavelength, $\lambda$, and propagating in distinct mode—i.e., mode 1, mode 2 . . . mode N—into an input line of router 250 by converting a portion of an incoming signal common to each mode converter, $230_1$, $230_2$ . . . $230_N$.

As a result of the above design, router 250 receives an input optical signal at a wavelength $\lambda$ having N number of component signals corresponding with N number of modes. As shown, router 250 is a 1×1 device. It will be apparent to skilled artisans, however, that router 250 may be designed to incorporate a greater number of inputs and outputs.

Coupled with the output of router 250 is mode demultiplexer 260. Mode demultiplexer 260 comprises N number of mode converters—$280_1$, $280_2$ . . . $280_N$. Each of these mode converters extracts from the output optical signal of router 250 one of the N number of optical signal components according to its mode. Consequently, a first mode converter $280_1$ converts an optical signal component into an optical signal at mode 1, second mode converter $280_2$ converts an optical signal component into an optical signal at mode 2, and Nth mode converter $280_N$ converts an optical signal component into an optical signal at mode N.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. It is therefore contemplated that the appended claims will cover any such modifications or embodiments as fall within the true scope of the invention.

What is claimed is:

1. A mode converter comprising:
    a first waveguide for supporting the propagation of electromagnetic energy at a first mode; and
    a second waveguide for supporting the propagation of electromagnetic energy at a second mode, the first and second waveguides each having a group index characteristic, wherein the first group index characteristic is matched with the second group index characteristic such that electromagnetic energy propagating through the first waveguide at the first mode couples to the second waveguide at the second mode.

2. The mode converter of claim 1, wherein the first waveguide comprises a single mode optical fiber, and the second waveguide comprises a multi-mode optical fiber.

3. The mode converter of claim 2, wherein the first and second and group index characteristics are matched by matching the slope of an $LP_{01}$ mode propagation constant of a single-mode optical fiber with the slope of an $LP_{02}$ mode propagation constant of a multi-mode optical fiber.

4. The mode converter of claim 2, wherein first and second and group index characteristics are matched within +/−5 percent.

5. The mode converter of claim 2, further comprising a bandwidth of 40 nm at a coupling efficiency of at least 97%.

6. An optical communication system for an optical signal, the optical communication system comprising:
    an input single mode optical fiber for supporting a first mode of propagation of the optical signal; and
    a mode converter for converting the mode of propagation of the optical signal from the first mode to a second mode, the mode converter comprising:
        a first optical coupling fiber for supporting the first mode of propagation, the first optical coupling fiber having a first group index characteristic; and
        a second optical coupling fiber for supporting at least the second mode of propagation, the second optical coupling fiber having a group index characteristic, wherein the first and second group index characteristics match such that the optical signal propagating through the first optical coupling fiber at the first mode propagates through the second optical coupling fiber at the second mode.

7. The optical communication system of claim 6, wherein the first optical coupling fiber comprises a single mode optical fiber, and the second optical coupling fiber comprises a multi-mode optical fiber.

8. The optical communication system of claim 7, wherein the first and second and group index characteristics are matched by matching the slope of an $LP_{01}$ mode propagation constant of a single-mode optical fiber with the slope of an $LP_{02}$ mode propagation constant of a multi-mode optical fiber.

9. The optical communication system of claim 7, wherein first and second and group index characteristics are matched within +/−5 percent.

10. The optical communication system of claim 7, further comprising a bandwidth of 40 nm at a coupling efficiency of at least 97%.

11. A dispersion compensation system for an optical signal, the dispersion compensation system comprising:
    an input single mode optical fiber for supporting the propagation of a first mode of the optical signal;
    a dispersion compensating optical fiber supporting the propagation of at least a second mode of the optical signal; and
    a mode converter for converting the mode of propagation of the optical signal from the first mode to the second mode, the mode converter comprising:
        a first optical coupling fiber for supporting the first mode of propagation, the first optical coupling fiber having a first group index characteristic; and
        a second optical coupling fiber for supporting at least the second mode of propagation, the second optical coupling fiber having a second group index characteristic, wherein the first and second group index characteristics match such that the optical signal propagating through the first optical coupling fiber at the first mode propagates through the second optical coupling fiber at the second mode.

12. The dispersion compensation system of claim 11, wherein the first optical coupling fiber comprises a single mode optical fiber, and the second optical coupling fiber comprises a multi-mode optical fiber.

13. The dispersion compensation system of claim 12, wherein the first and second and group index characteristics are matched by matching the slope of an $LP_{01}$ mode propagation constant of a single-mode optical fiber with the slope of an $LP_{02}$ mode propagation constant of a multi-mode optical fiber.

14. The dispersion compensation system of claim 12, wherein first and second and group index characteristics are matched within +/−5 percent.

15. The dispersion compensation system of claim 12, further comprising a bandwidth of 40 nm at a coupling efficiency of at least 97%.

16. A system for multiplexing at least two optical component signals of differing modes onto an input optical signal having an input mode of propagation, the system comprising:
    an input waveguide for propagating the input optical signal; and
    at least a two mode converters, each mode converter converting the mode of propagation of the input optical signal from the input mode to one of the differing modes, each mode converter comprising:
        a first optical coupling fiber for supporting the first mode of propagation, the first optical coupling fiber having a first group index characteristic; and
        a second optical coupling fiber for supporting at least the one of the differing modes of propagation, the second optical coupling fiber having at least one of differing group index characteristics, wherein the first and the at least one of the differing group index characteristics match such that the optical signal propagating through the first optical coupling fiber at the first mode propagates through the second optical coupling fiber at the one of the differing modes.

17. The system of claim 16, wherein the first optical coupling fiber comprises a single mode optical fiber, and the second optical coupling fiber comprises a multi-mode optical fiber.

18. The system of claim 17, wherein the first and second and group index characteristics are matched by matching the slope of an $LP_{01}$ mode propagation constant of a single-mode optical fiber with the slope of another mode propagation constant of a multi-mode optical fiber.

19. The system of claim 17, wherein first and second and group index characteristics are matched within +/−5 percent.

20. The system of claim 17, further comprising a bandwidth of 40 nm at a coupling efficiency of at least 97%.

* * * * *

UNITED STATES PATENT AND TRADEMARK OFFICE
CERTIFICATE OF CORRECTION

PATENT NO. : 6,628,859 B2  Page 1 of 3
APPLICATION NO. : 09/815142
DATED : September 30, 2003
INVENTOR(S) : Huang et al.

It is certified that error appears in the above-identified patent and that said Letters Patent is hereby corrected as shown below:

| | |
|---|---|
| Column 7, line 21, Claim 1 | After "first waveguide", Insert --formed of a single mode optical fiber and-- |
| Column 7, line 23, Claim 1 | After "second waveguide", Insert --formed of a multi-mode optical fiber and-- |
| Column 7, line 30, Claim 1 | After "second mode", Insert --, the first and second and group index characteristics matched by matching the slope of an $LP_{01}$ mode propagation constant of a single mode optical fiber with the slope of an $LP_{02}$ mode propagation constant of a multi-mode optical fiber-- |
| Column 7, line 39, Claim 4 | Delete "2", Insert --1-- |
| Column 7, line 42, Claim 5 | Delete "2", Insert --1-- |
| Column 7, line 51, Claim 6 | After "coupling fiber", Insert --formed of a single mode optical fiber and-- |
| Column 7, line 54, Claim 6 | After "coupling fiber", Insert --formed of a multi-mode optical fiber and-- |
| Column 7, line 61, Claim 6 | After "second mode", Insert --, the first and second and group index characteristics matched by matching the slope of an $LP_{01}$ mode propagation constant of a single mode optical fiber with the slope of an $LP_{02}$ mode propagation constant of a multi-mode optical fiber-- |
| Column 8, line 5, Claim 9 | Delete "7", Insert --6-- |
| Column 8, line 8, Claim 10 | Delete "7", Insert --6-- |
| Column 8, line 21, Claim 11 | After "coupling fiber", Insert --formed of a single mode optical fiber and-- |

UNITED STATES PATENT AND TRADEMARK OFFICE
CERTIFICATE OF CORRECTION

PATENT NO.        : 6,628,859 B2
APPLICATION NO.  : 09/815142
DATED            : September 30, 2003
INVENTOR(S)      : Huang et al.

It is certified that error appears in the above-identified patent and that said Letters Patent is hereby corrected as shown below:

Column 8, line 24, Claim 11
After "coupling fiber",
Insert --formed of a multi-mode optical fiber and--

Column 8, line 31, Claim 11
After "second mode",
Insert --, the first and second group index characteristics matched by matching the slope of an $LP_{01}$ mode propagation constant of a single mode optical fiber with the slope of an $LP_{02}$ mode propagation constant of a multi-mode optical fiber--

Column 8, line 42, Claim 14
Delete "12",
Insert --11--

Column 8, line 45, Claim 15
Delete "12",
Insert --11--

Column 8, line 54, Claim 16
Delete "at least a",
Insert --at least--

Column 8, line 58, Claim 16
After "coupling fiber",
Insert --formed of a single mode optical fiber and--

Column 8, line 61, Claim 16
After "coupling fiber",
Insert --formed of a multi-mode optical fiber and--

Column 9, line 3, Claim 16
After "differing modes",
Insert --, the first and second and group index characteristics matched by matching the slope of an $LP_{01}$ mode propagation constant of a single-mode optical fiber with the slope of another mode propagation constant of a multi-mode optical fiber--

Column 10, line 4, Claim 19
Delete "17",
Insert --16--

UNITED STATES PATENT AND TRADEMARK OFFICE
CERTIFICATE OF CORRECTION

PATENT NO. : 6,628,859 B2
APPLICATION NO. : 09/815142
DATED : September 30, 2003
INVENTOR(S) : Huang et al.

It is certified that error appears in the above-identified patent and that said Letters Patent is hereby corrected as shown below:

Column 10, line 6, Claim 20    Delete "17",
                               Insert --16--

Signed and Sealed this

Twenty-fourth Day of October, 2006

JON W. DUDAS
*Director of the United States Patent and Trademark Office*